April 22, 1930.   F. K. EASTMAN   1,755,288
DOORCHECK
Filed May 5, 1928

INVENTOR.
FLOYD K. EASTMAN.
BY
ATTORNEYS.

Patented Apr. 22, 1930

1,755,288

UNITED STATES PATENT OFFICE

FLOYD K. EASTMAN, OF KOKOMO, INDIANA, ASSIGNOR TO CONCEALED DOOR CHECK COMPANY, OF KOKOMO, INDIANA, A CORPORATION

DOORCHECK

Application filed May 5, 1928. Serial No. 275,277.

This invention relates to a door check particularly adapted for use in limiting the opening movement of vehicle doors wherein said check will be concealed upon the door being closed.

The principal object of the invention is to provide a partially concealed check of this character which is particularly adapted for use in connection with metal body frames, and which will provide a check of substantial strength for withstanding such stress and strain as it may be subjected to by abnormal door movement in the metal frame type of body construction, while at the same time providing a suitable resilient bumping element.

The features and advantages of the invention with respect to the construction of the strap for permitting it to be economically produced and be inconspicuously mounted, will be hereinafter more fully set forth and described in the following specifications and claims.

The full nature of the invention will be more clearly understood from the accompanying drawings and the following description and claims.

Figure 1:
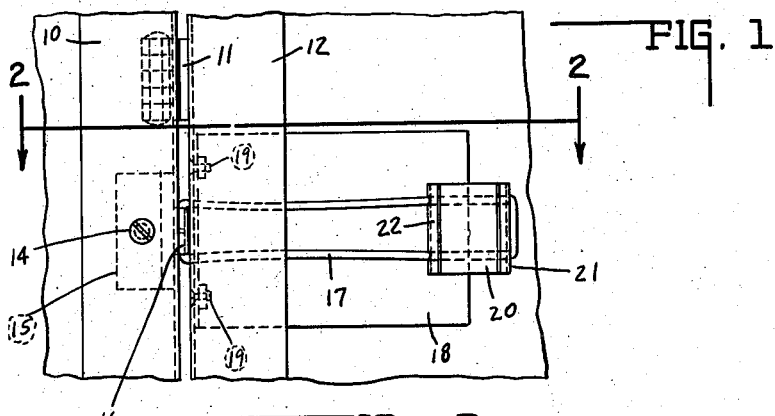
Figure 2:
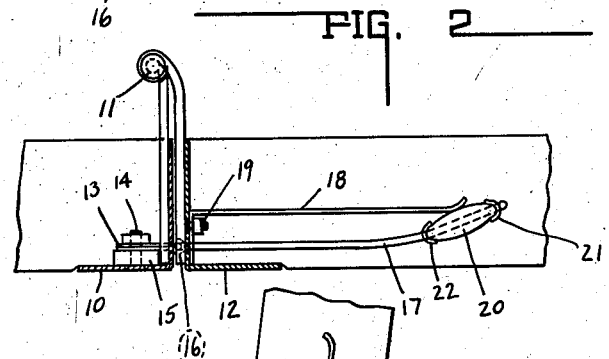
Figure 3:
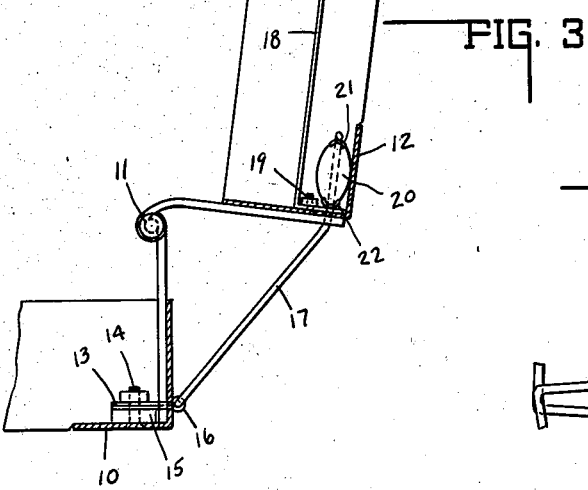
Figure 4:
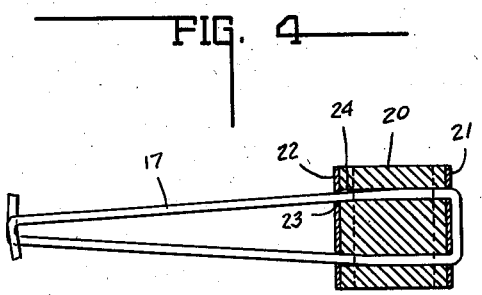

Fig. 1 is a front elevation of a portion of the door and body frame showing the strap mounted therein. Fig. 2 is a section taken on the line 2—2 of Fig. 1. Fig. 3 is the same as Fig. 2 showing the door in open position. Fig. 4 is a view of the strap removed from the door with the bumper element shown in central vertical section.

In the drawings there is shown portions of the metal upright body frame 10 of a vehicle to which is hingedly connected by the hinge 11 a metal door frame 12. Hingedly secured to the body frame there is a hinge clip 13 held in place by the screw 14 and spaced from the outer flange of the frame by the spacing block 15. The hinge portion of the clip indicated at 16 extends outwardly toward the door frame through a suitable slot for receiving the inwardly turned ends of the double wire check strap 17.

The strap 17, comprising two wires spaced apart, extends through a suitable slot formed in the door frame adjacent the body frame, and rearwardly therefrom into the interior of the door substantially parallel to and adjacent the protecting plate 18, which plate is rigidly secured to the inner surface of the door frame by the nut and bolt indicated at 19.

The strap 17 is folded over at the rear end thereof so that when in operation it is in the form of an elongated rectangle. At the rear end of the strap there is mounted thereon a soft rubber bumper 20 which is held in place thereon between the metal retaining plates 21 and 22. Said bumper and plates are slidably mounted on the spaced wire members forming the strap which extend through suitable holes formed therein, as best illustrated in Fig. 4. Thus, when the door is open, the frame thereof will slide rearwardly with respect to strap 17 until it engages the plate 22 which will slide on the strap compressing the bumper 20 for absorbing the shock.

In order that the inwardly turned free ends of the strap will be at all times held within the hinged portion 16 of the clip 13, not only by the length of the slot in the frame 12 but by the spring pressure thereof, the holes in the plate 22 indicated at 23 in Fig. 4 are closer together than the openings indicated at 24 formed in the bumper 20 so as to normally cause the free ends of the strap to approach each other and thus maintain a spring tension on the free ends thereof tending to press inwardly against the hinge portion 16 of the clip and thereby maintain the inwardly turned ends of the strap therein. By means of this construction, the strap is conveniently installed and removed after the door is completed and the upholstery panel mounted thereon since the free hooked ends of the strap may be readily spread apart and engaged in or withdrawn from the hinge portion 16 of the clip.

The invention claimed is:

1. A door check comprising a wire strap bent upon itself to form a pair of legs extending in spaced relation to each other and substantially parallel when in operative position, a rubber bumper provided with a pair of spaced and substantially parallel openings therethrough, through which the legs of said strap are adapted to extend for slidably supporting said bumper thereon against the closed end of said strap, and means mounted on the legs of said strap adjacent said bumper for normally pinching said legs together whereby the free ends thereof will be maintained under tension when mounted in operative position.

2. A door check comprising a strap formed of wire bent U-shaped so as to have a closed end and a pair of spaced legs extending outwardly therefrom in substantially parallel position when in operation, inwardly bent projections formed on the free ends of the legs of said strap, a rubber bumper provided with a pair of spaced and substantially parallel openings therethrough, through which the legs of said strap are adapted to extend and slidably support said bumper adjacent the closed end thereof, and a metal plate provided with openings through which said legs extend of slightly less distance apart than the openings through said bumper for normally drawing said legs toward each other and maintaining them under tension when said strap is in operative position.

In witness whereof, I have hereunto affixed my signature.

FLOYD K. EASTMAN.